United States Patent
Yagi et al.

(10) Patent No.: US 9,564,691 B2
(45) Date of Patent: Feb. 7, 2017

(54) METHOD FOR MANUFACTURING CRIMP TERMINAL, CRIMP TERMINAL, AND WIRE HARNESS

(71) Applicants: Furukawa Electric Co., Ltd., Tokyo (JP); Furukawa Automotive Systems Inc., Shiga (JP)

(72) Inventors: Saburo Yagi, Tokyo (JP); Takashi Shigematsu, Tokyo (JP); Masaya Satou, Tokyo (JP); Shinya Kojima, Tokyo (JP); Akira Tachibana, Tokyo (JP)

(73) Assignees: FURUKAWA AUTOMOTIVE SYSTEMS INC., Shiga (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/832,376

(22) Filed: Aug. 21, 2015

(65) Prior Publication Data
US 2015/0364837 A1 Dec. 17, 2015

Related U.S. Application Data

(63) Continuation of application No. PCT/JP2014/054393, filed on Feb. 24, 2014.

(30) Foreign Application Priority Data

Feb. 22, 2013 (JP) .................................. 2013-033959
Dec. 12, 2013 (JP) .................................. 2013-257247

(51) Int. Cl.
*H01R 43/05* (2006.01)
*H01R 4/18* (2006.01)
(Continued)

(52) U.S. Cl.
CPC ........... *H01R 4/187* (2013.01); *B23K 26/0344* (2015.10); *B23K 26/24* (2013.01); *H01R 4/183* (2013.01);
(Continued)

(58) Field of Classification Search
CPC ............................ H01R 4/187; H01R 43/005
See application file for complete search history.

(56) References Cited

U.S. PATENT DOCUMENTS 2,693,216 A  11/1954  Kerchner et al.
3,364,460 A  1/1968  Bergan et al.
(Continued)

FOREIGN PATENT DOCUMENTS

JP  S61-289932 A  12/1986
JP  S64-018592 A  1/1989
(Continued)

OTHER PUBLICATIONS

English translation of Written Opinion for PCT/JP2014/054393 dated May 27, 2014.
(Continued)

*Primary Examiner* — Ross Gushi
(74) *Attorney, Agent, or Firm* — Thompson Coburn LLP

(57) ABSTRACT

A method for manufacturing a crimp terminal having a crimp portion that allows crimp connection to a conductor part of a coated wire includes forming a tubular body by bringing together side edges of a plate material made of metal composed of a copper alloy having a copper content ratio of greater than or equal to 70%, irradiating a periphery of the sides edges, which are brought together, with laser light from a laser irradiation unit to weld the side edges which are brought together, and setting a power density of the laser light and a sweep rate of the laser light in such a
(Continued)

manner that a weld bead formed at the side edge portion after the welding has a width of 80 μm to 390 μm.

13 Claims, 6 Drawing Sheets

(51) Int. Cl.
  *B23K 26/24* (2014.01)
  *H01R 43/02* (2006.01)
  *H01R 43/048* (2006.01)
  *H01R 4/20* (2006.01)
  *H01R 43/00* (2006.01)

(52) U.S. Cl.
  CPC ........ *H01R 43/0221* (2013.01); *H01R 43/048* (2013.01); *H01R 4/206* (2013.01); *H01R 43/005* (2013.01); *H01R 2201/26* (2013.01); *Y10T 29/49215* (2015.01)

(56) References Cited

U.S. PATENT DOCUMENTS

| | | | | |
|---|---|---|---|---|
| 5,053,601 A * | 10/1991 | Landtwing | B21D 28/22 | 219/121.45 |
| 5,343,010 A * | 8/1994 | Urech | B23K 26/26 | 219/105 |
| 5,478,983 A * | 12/1995 | Rancourt | B21D 19/005 | 219/121.63 |
| 5,591,359 A * | 1/1997 | Saitou | B23K 15/006 | 148/525 |
| 5,607,605 A * | 3/1997 | Musasa | B23K 26/032 | 219/121.63 |
| 5,841,097 A * | 11/1998 | Esaka | B23K 26/0608 | 219/121.63 |
| 5,971,251 A * | 10/1999 | Moore | H01R 4/023 | 228/112.1 |
| 6,060,682 A * | 5/2000 | Westbroek | B23K 26/24 | 219/105 |
| 6,261,701 B1 * | 7/2001 | Fields, Jr. | B23K 26/032 | 428/577 |
| 6,573,472 B1 * | 6/2003 | Waffenschmidt | B23K 26/02 | 219/121.63 |
| 6,818,857 B1 * | 11/2004 | Cho | B23K 26/0604 | 219/121.64 |
| 7,086,911 B2 * | 8/2006 | Simmel | H01R 13/18 | 439/839 |
| 7,191,518 B2 * | 3/2007 | Beloritsky | H01R 13/187 | 29/747 |
| 7,234,236 B2 * | 6/2007 | Derleth | H01R 4/4881 | 174/75 C |
| 7,592,566 B2 * | 9/2009 | Maura | H01H 11/041 | 219/121.64 |
| 8,415,027 B2 * | 4/2013 | Hayashi | H01R 4/029 | 428/213 |
| 8,506,336 B2 * | 8/2013 | Oh | H01R 13/04 | 439/843 |
| 9,118,123 B2 * | 8/2015 | Kawamura | H01R 4/187 | |
| 9,240,635 B2 * | 1/2016 | Kawamura | H01R 4/206 | |
| 9,246,292 B2 * | 1/2016 | Tachibana | H01R 43/048 | |
| 9,281,574 B2 * | 3/2016 | Kawamura | H01R 4/183 | |
| 2001/0003687 A1 | 6/2001 | Kondo | | |
| 2004/0142607 A1 * | 7/2004 | Asakura | H01R 43/0221 | 439/877 |
| 2007/0246446 A1 * | 10/2007 | Lee | B23K 10/02 | 219/121.64 |
| 2014/0374155 A1 * | 12/2014 | Tachibana | H01R 4/62 | 174/84 C |
| 2014/0378009 A1 * | 12/2014 | Yamada | H01R 4/187 | 439/865 |
| 2015/0126078 A1 * | 5/2015 | Kawamura | H01R 43/005 | 439/874 |
| 2015/0333416 A1 * | 11/2015 | Kihara | H01R 4/20 | 439/877 |
| 2015/0357723 A1 * | 12/2015 | Tachibana | C25D 7/00 | 439/878 |
| 2015/0357724 A1 * | 12/2015 | Okuno | C25D 7/00 | 439/877 |
| 2015/0357725 A1 * | 12/2015 | Matsuo | C22C 9/00 | 439/877 |
| 2015/0360319 A1 * | 12/2015 | Yagi | B23K 26/262 | 219/121.64 |
| 2015/0364835 A1 * | 12/2015 | Tonoike | H01R 43/0488 | 439/879 |
| 2015/0364836 A1 * | 12/2015 | Yagi | B23K 26/32 | 439/877 |
| 2015/0364837 A1 * | 12/2015 | Yagi | H01R 4/187 | 439/879 |
| 2015/0364838 A1 * | 12/2015 | Tonoike | H01R 4/187 | 439/879 |
| 2015/0364891 A1 * | 12/2015 | Kojima | B23K 26/0622 | 29/34 R |
| 2016/0006135 A1 * | 1/2016 | Terashima | H01R 4/183 | 174/72 A |
| 2016/0099507 A1 * | 4/2016 | Tachibana | H01R 43/048 | 439/877 |

FOREIGN PATENT DOCUMENTS

| | | |
|---|---|---|
| JP | H03-198991 A | 8/1991 |
| JP | H07-161448 A | 6/1995 |
| JP | 2001-167821 A | 6/2001 |
| JP | 2010-105018 A | 5/2010 |
| JP | 2010-176886 A | 8/2010 |
| JP | 2012-069449 A | 4/2012 |
| JP | 2012-187590 A | 10/2012 |
| KR | 10-2014-0114027 A | 9/2014 |
| KR | 10-2014-0126779 A | 10/2014 |
| WO | 2008/104980 A2 | 9/2008 |

OTHER PUBLICATIONS

English translation of International Preliminary Report on Patentability (Chapter I) for PCT/JP2014/054393 dated Aug. 25, 2015.
International Search Report and Written Opinion dated May 27, 2014 for PCT/JP2014/054393.
Office Action dated May 19, 2014 for corresponding Japanese Patent Application No. 2014-512567.
Decision to Grant a Patent dated Jul. 7, 2014 for corresponding Japanese Patent Application No. 2014-512567.
Notice of Allowance dated Nov. 27, 2014 for corresponding Korean Application No. 10-2014-7028808.
Extended European Search Report for EP Application 14754350.8 dated Nov. 7, 2016.
Herrmann et al., "Laser Welding of Copper", Industrial Laser Solutions for Manufacturing, Jan. 1, 2013, retrieved from the internet on Oct. 27, 2016, http://www.industrial-lasers.com/articles/print/volume-28/issue-1/ reatures/laser-welding-of-copper.html.

* cited by examiner

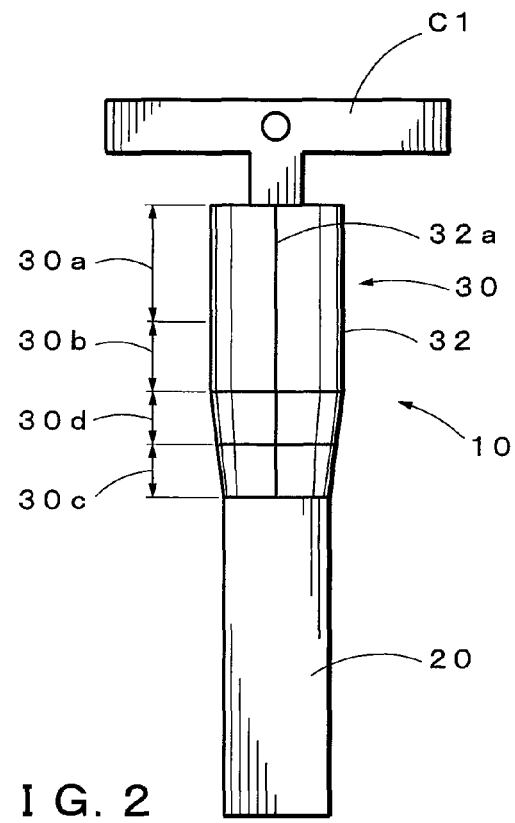
F I G. 2
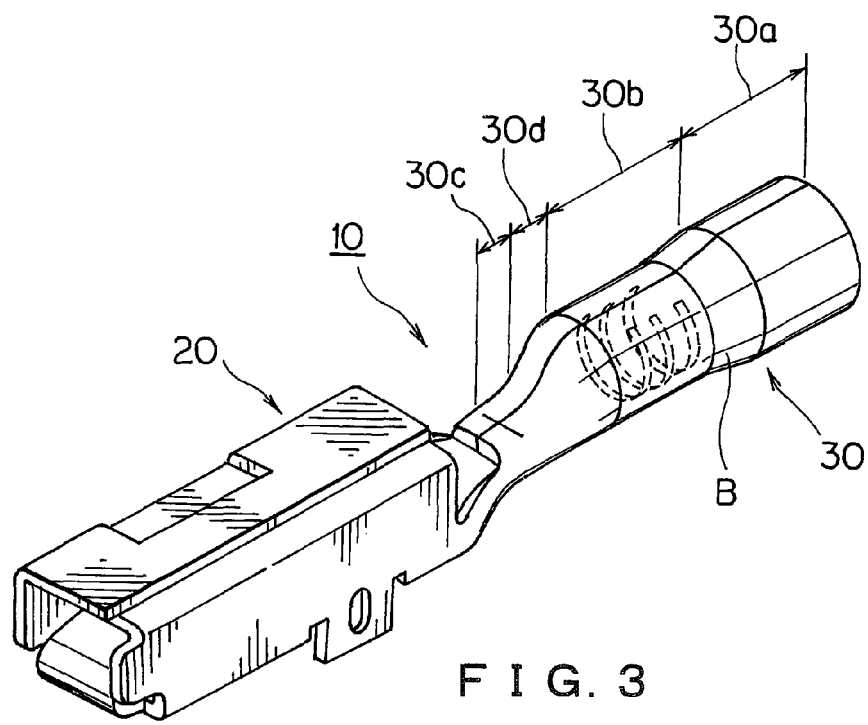
F I G. 3

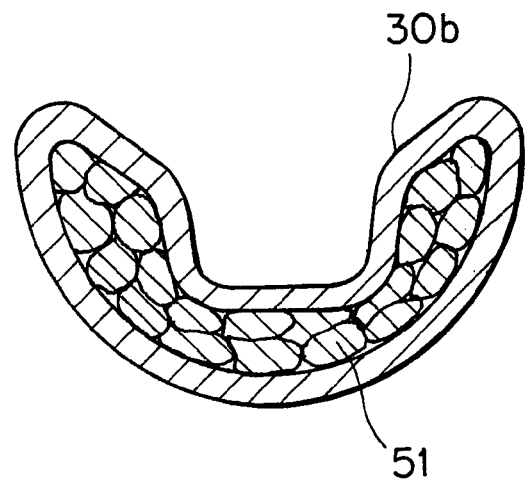
F I G. 6
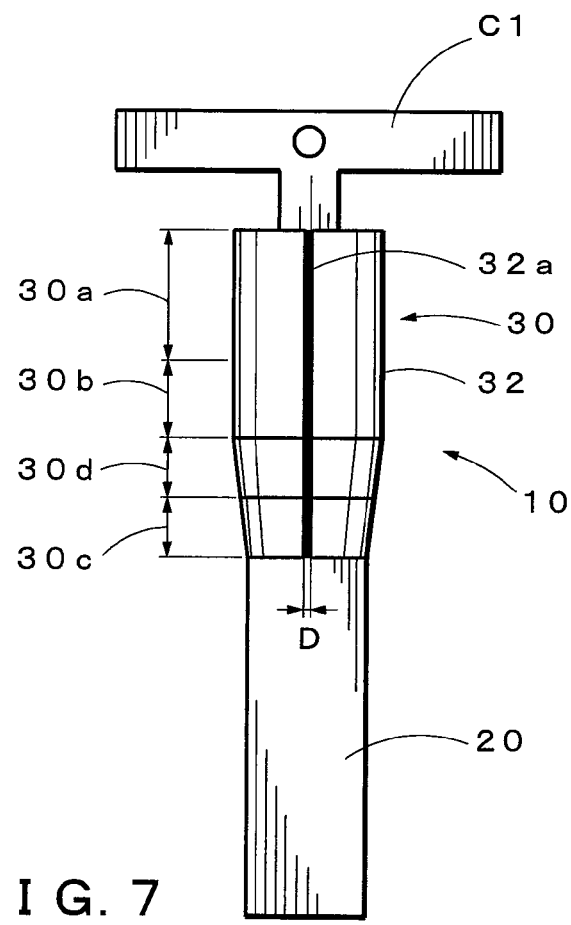
F I G. 7

METHOD FOR MANUFACTURING CRIMP TERMINAL, CRIMP TERMINAL, AND WIRE HARNESS

CROSS REFERENCE TO RELATED APPLICATIONS

This is a continuation application of International Patent Application No. PCT/JP2014/054393 filed Feb. 24, 2014, which claims the benefit of Japanese Patent Application Nos. 2013-033959 and 2013-257247, filed Feb. 22, 2013 and Dec. 12, 2013, respectively, the full contents of all of which are hereby incorporated by reference in their entirety.

BACKGROUND

Technical Field

The present disclosure relates to a method for manufacturing a crimp terminal serving to connect a wire harness for an automobile, the crimp terminal, and a wire harness.

Background

Wire harnesses are often used for internal wiring of automobiles. A wire harness is a module in which a plurality of coated wires are assembled in accordance with in-vehicle wiring specifications. Crimp terminals, for example, are crimped to ends of each of the coated wires. When connecting a crimp terminal to a wire end of the wire harness, electrical connection between the wire end and the crimp terminal is provided by stripping the insulating coating layer at a wire end to expose the core wire, and swaging and crimping a core wire barrel of the crimp terminal to the exposed portion of the core wire. The connecting portion between the crimp terminal and the wire end is sealed with resin so as to prevent corrosion of the core wire due to ingress of moisture into the wire from the connecting portion (see Japanese Laid-Open Patent Publication No. 2001-167821 and Japanese Laid-Open Patent Publication No. 2012-069449).

However, sealing the connecting portion of the crimp terminal and the wire end with resin gives rise to an increase in the manufacturing cost of the wire harness. This is because, in addition to the fact that the resin used is expensive in itself, time is required to apply and cure the resin in a resin molding process or a coating process.

Therefore, it is attempted to bend the electric wire connecting portion (the crimp portion) of the crimp terminal into a tubular shape by press molding, and then the entire butted interface on the plate ends that are formed in the portion bent into a tubular shape are laser-welded together. Subsequently, one end side of the portion bent into a tubular shape is laser-welded and sealed into a sealing portion to form a barrel member, to configure the electric wire connecting portion into a hermetically-closed structure.

However, the joining strength on the weld portion by laser welding depends mainly on an intensity and a sweep rate of the laser light radiated onto the weld portion. If the laser welding is performed outside the proper range of the parameters of the intensity and the sweep rate of the laser light, the joining strength on the weld portion of the crimp portion becomes weak. This causes cracks in the weld portion when crimping the crimp terminal to the electric wire terminals.

Especially, in a structure in which the core wire and the coating layer of the electric wire are sealed with a tubular barrel, the shape of the crimped core wire portion is significantly different from the shape of the crimped coating layer portion. This is because the core wire portions need to be formed into the most suitable shape to make the electrical conduction stable, whereas the coating layer portions need to be formed into an appropriate shape to prevent moisture from entering the inside of the tubular barrel from the gap between the crimp terminal and the electric wires. This brings a risk of cracking in the weld portion due to a complex force acting on the terminal when crimping the electric wires and the terminal together.

In addition, considering the mass productivity, high accuracy in determining the positions of the terminals and hence accuracy of welding is required since, for example, 400 terminals are welded per minute. In this regard, the possibility of high-quality laser welding by providing a certain level of width between the welding marks (weld bead) to weld the butted interface between the plate edges is becoming clearer. In other words, having a narrow weld bead requires a high degree of accuracy in determining the positions, which leads to a narrowing of the "process window" for treating the welded terminal. A wide weld bead, on the other hand, causes excessive melting of the weld portion as well as welding defects in multiple places.

The present disclosure is related to providing a method for manufacturing a crimp terminal which enables performing high-quality laser welding on a workpiece by controlling the intensity and the sweep rate of laser light to be radiated onto a weld portion to appropriate values. The present disclosure also provides the crimp terminal itself, and a wire harness having the crimp terminal.

SUMMARY

According to a first aspect of the present disclosure, a method for manufacturing a crimp terminal having a crimp portion that allows crimp connection to a conductor part of a coated wire is provided that includes: forming a tubular body by bringing together side edges of a plate material made of metal; irradiating a periphery of the sides edges, which are brought together, with laser light from a laser irradiation unit to weld the side edges which are brought together; and setting a power density of the laser light and a sweep rate of the laser light in such a manner that a weld bead formed at the side edge portion after the welding has a width of 80 μm to 390 μm.

In the method for manufacturing a crimp terminal according to the present disclosure, it is preferred that a laser light source of the laser irradiation means be a fiber laser.

The width of the weld bead is preferably 101 μm to 365 μm, and more preferably 172 μm to 273 μm.

It is preferred that the power density of the laser light and the sweep rate of the laser light be set in such a manner that the weld bead formed on the welded side edge portion has a width of 180 μm to 270 μm.

It is preferred that the thickness of the tubular body irradiated with the laser light be adjusted to less than or equal to 0.8 mm.

According to a second aspect of the present disclosure, a crimp terminal according to the present disclosure is a crimp terminal having a crimp portion that allows crimp connection to a conductor part of a coated wire, the crimp terminal including: a brought-together portion obtained by bringing together side edges of a plate material made of metal; and a weld bead portion that is formed at the brought-together portion by being irradiated with laser light emitted from a laser irradiation unit onto the brought-together portion, wherein the weld bead portion has a width of 80 μm to 390 μm.

In the crimp terminal according to the present disclosure, it is preferred that a laser light source of the laser irradiation means be a fiber laser.

The width of the weld bead portion is preferably 101 μm to 365 μm, and more preferably 172 μm to 273 μm.

It is preferred that the butted portion have a thickness of less than or equal to 0.8 mm.

The butted portion is formed by bringing the side edges into abutment with each other or by overlapping the side edges on top of each other.

A wire harness of the present disclosure is a wire harness having at least one coated wires, wherein an end portion of the at least one coated wires is provided with the crimp terminal described in any one of claims 6 to 11.

In the wire harness of the present disclosure, it is preferred that a conductor part of each of the at least one coated wires be made of aluminum or aluminum alloy.

The method for manufacturing a crimp terminal according to the present disclosure can produce a crimp terminal with a high-quality crimp portion by performing high-quality laser welding on a workpiece. Especially with a simple method for setting a weld bead width and then measuring a weld bead width after the execution of laser welding, the present disclosure can ensure a crimp terminal that remains reliable even after the crimping process.

BRIEF DESCRIPTION OF DRAWINGS

FIG. 2 is a plan view of the crimp terminal.

FIG. 3 is a perspective view showing an example of another crimp terminal.

FIG. 6 is a cross-sectional diagram showing the state of a crimped crimp terminal.

FIG. 7 is a plan view of a crimp terminal for explaining the weld bead width.

DETAILED DESCRIPTION

Figure 1:
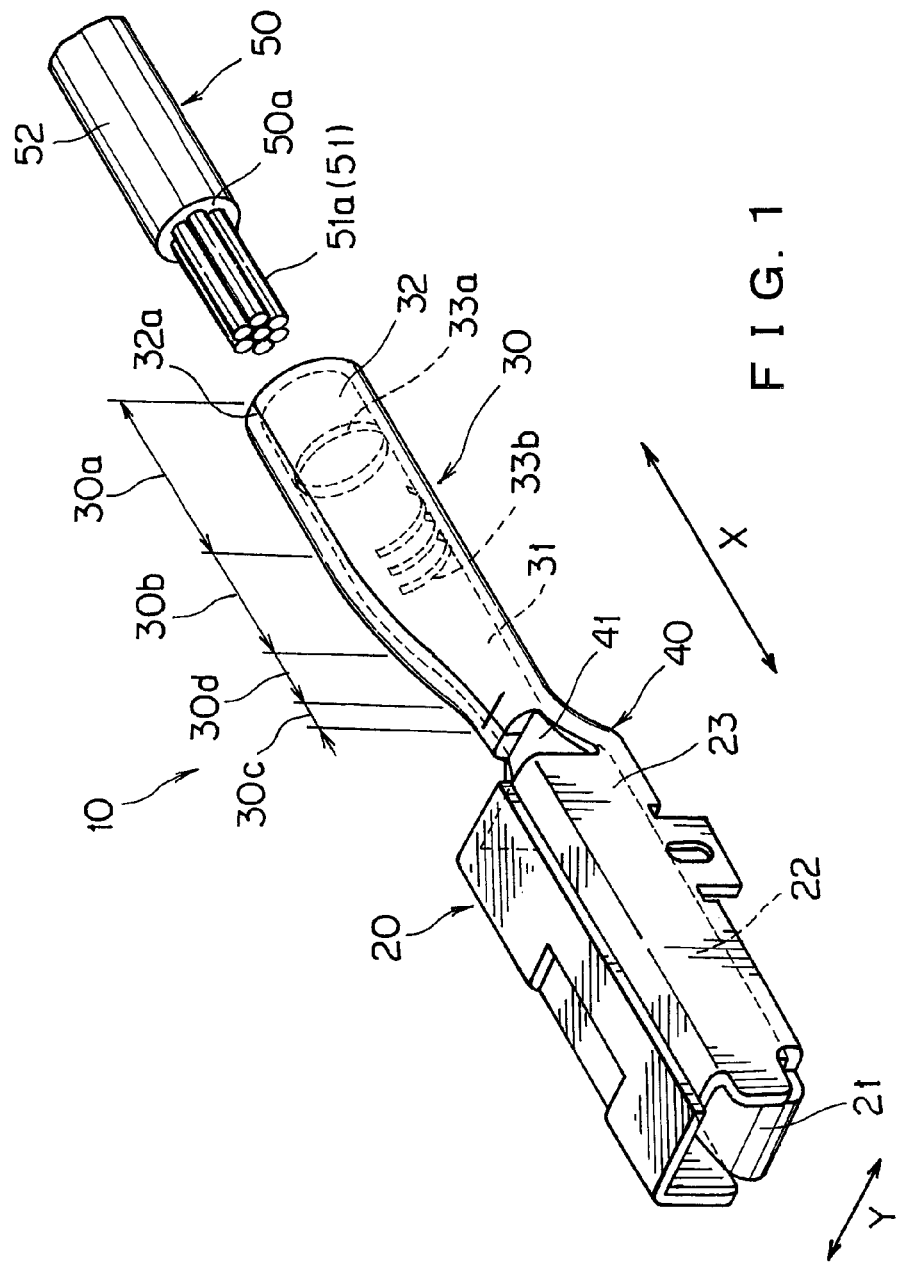
FIG. 1 is a perspective view showing how a wire cable is connected to a crimp terminal.

Hereinafter, an embodiment of the present disclosure (referred to as "present embodiment" hereinafter) will be described. FIG. 1 is a perspective view showing how a wire cable is connected to a crimp terminal. FIG. 2 is a plan view of the crimp terminal.

[1. Configuration of Crimp Terminal]

As shown in FIG. 1, a crimp terminal 10 manufactured by a manufacturing method according to the present embodiment is a female crimp terminal having a box portion 20 and a crimp portion 30. The crimp portion 30 of the crimp terminal 10 allows crimp connection with an aluminum core wire 51, which is a conductor part of a coated wire 50, and the coated wire 50 is crimped to the crimp portion 30.

In the present embodiment, the box portion 20 is illustrated as an example of a female terminal in which an insertion tab of a male terminal or the like is inserted, but the shape of the detailed portion of the box portion 20 of the present disclosure is not particularly limited. In other words, as an alternative, an insertion tab of a male terminal, for example, can be provided in place of the female box portion 20, to form the crimp terminal.

The coated wire 50 is connected to the crimp portion 30 of the crimp terminal 10. The coated wire 50 includes an aluminum core wire 51, wherein the aluminum core wire 51 is coated with an insulation coating 52. The aluminum core wire 51 is constituted by bundling aluminum wire strands together. An electric wire exposed portion 51a where the aluminum core wire 51 is exposed from the insulation coating 52 is formed in front of a coated tip end 50a of the coated wire 50. The aluminum core wire 51 is constituted by twisting aluminum alloy wires so as to have a cross-sectional area of 0.75 mm$^2$.

The core wire of the aluminum electric wire may be an aluminum core wire that consists of, for example, approximately 0.2 mass % iron (Fe), approximately 0.2 mass % copper (Cu), approximately 0.1 mass % magnesium (Mg), approximately 0.4 mass % silicon (Si), and the balance consisting of aluminum (Al) and incidental impurities. Examples of other possible alloy compositions include an alloy composition consisting of approximately 1.05 mass % Fe, approximately 0.15 mass % Mg, approximately 0.04 mass % Si, and the balance consisting of Al and incidental impurities, or an alloy composition consisting of approximately 1.0 mass % Fe, approximately 0.04 mass % Si, and the balance consisting of Al and incidental impurities, and an alloy composition consisting of approximately 0.2 mass % Fe, approximately 0.7 mass % Mg, approximately 0.7 mass % Si, and the balance consisting of Al and incidental impurities. These compositions may also contain alloy elements such as Ti, Zr, Sn, and Mn. Such core wire may be a seven to nineteen stranded twisted 0.5 to 2.5 sq (mm$^2$) aluminum core wire.

Instead of the aluminum electric wire, a copper electric wire formed by coating a conductor made of copper or copper alloy with an insulation coating can be used as the coated wire 50. Alternatively, the core wire of the coated wire 50 may be single wired.

A material containing, for example, polyolefin such as PE or PP or PVC as a main component can be used as the coating material of the core wire.

The box portion 20 of the crimp terminal 10 is configured into a box shape having an inverted hollow quadrangular prism shape. An elastic contact piece 21 is provided inside the box portion 20. The elastic contact piece 21 is bent back towards the rear in a longitudinal direction X, and makes contact with an insertion tab of a male terminal, not shown, which is inserted into the box portion 20. Further, the box portion 20 is configured into a substantially rectangular shape as viewed from the tip end in the longitudinal direction X, by bending its side surface portions 23 provided on either side of a bottom surface portion 22 in a width direction Y orthogonal to the longitudinal direction X so as to overlap each other.

In the present embodiment, the longitudinal direction X is a direction that coincides with a longitudinal direction of the coated wire 50 to which the crimp portion 30 is crimped and connected, and the width direction Y is a direction that intersects with the longitudinal direction X in a substantially horizontal plane, as shown in FIG. 1. The side of the box portion 20 towards the crimp portion 30 is referred to as the front, and the side of the crimp portion 30 towards the box portion 20 is referred to as the rear. Further, a reverse face side inclined portion 41 that inclines upward gradually toward the rear is formed in a coupling portion 40 that couples the box portion 20 and the crimp portion 30 to each other.

Before being crimped, the crimp portion 30 of the crimp terminal 10 is formed as a tubular body by butting an end portions 32a of a crimping surface 31 and an end portions 32a of the crimp surface 31 extending on either side in the width direction Y of a curled barrel forming piece 32, and welding the end portions 32a together, as shown in FIG. 2. The crimp portion 30 is in substantially an O-shape as viewed from the rear. The length of the barrel forming pieces 32 in the longitudinal direction X is formed to be greater than the exposed length in the longitudinal direction X of the exposed wire portion 51a which is exposed on the front side of the longitudinal direction X, from the coating front end 50a, which is the front end of the insulating coating 52 on the front side in the longitudinal direction X.

The crimp portion 30 also has a coating crimp tubular portion 30a to which the insulation coating 52 shown in FIG. 1 is crimped, and an electric wire crimp tubular portion 30b that is disposed in front of the coating crimp tubular portion 30a and to which the electric wire exposed portions 51a of the aluminum core wires 51 are crimped. A sealing portion 30c is formed in front of the electric wire crimp tubular portion 30b. The sealing portion 30c has its front end portion deformed in a manner that the plates are overlapped on each other, and is welded in the width direction Y as shown in FIG. 2. The sealing portion may be formed into a substantially U-shape as viewed in cross section perpendicular to the longitudinal direction of the crimp portion 30. An inclined portion 30d inclining downward toward the front is formed between the electric wire crimp tubular portion 30b and the sealing portion 30c. The crimp terminal 10 is configured as a closed-barrel terminal with the hollow quadrangular prism box portion 20 and the crimp portion 30 that is in substantially an O-shape as viewed from the rear.

Three coating locking grooves 33a, grooves in the width direction Y, are formed on an inner surface of the coating crimp tubular portion 30a of the crimp portion 30 at predetermined intervals along the longitudinal direction X. Each of the coating locking grooves 33a has a cross section in the shape of an arc, forms a waved shape by being connected in the longitudinal direction, and forms an annular groove continuing over the entire circumference of the crimp surface 31. Such shape of the coating locking grooves 33a causes the insulation coating 52 to enter into these grooves when crimped to the crimp portion 30.

Three wire locking grooves 33b, which are grooves in the width direction Y, are formed at predetermined intervals along the longitudinal direction X on an inner surface of the electric wire crimp tubular portion 30b. The cross section of each of the wire locking grooves 33b is in the shape of a rectangular recess, and the wire locking grooves 33b configure annular grooves continuing to the middle of the crimp surface 31 in its circumferential direction. Such shape of the wire locking grooves 33b causes the aluminum core wires 51 to enter into the wire locking grooves 33b when crimped to the crimp portion 30. Such a configuration improves the conductivity between the crimp portion 30 and the aluminum core wires 51.

Note that the crimp terminal 10 is not limited to the configuration shown in FIGS. 1 and 2 and can be configured as shown in FIG. 3. Specifically, an inclined portion B is provided between the coating crimp tubular portion 30a and electric wire crimp tubular portion 30b of the crimp portion 30 shown in FIG. 3 so that a step is created therebetween. In this configuration, the inner diameter of the electric wire crimp tubular portion 30b is smaller than the inner diameter of the coating crimp tubular portion 30a. In other words, a diameter of a part covering the insulation coating 52 of the coated wire 50, which is not shown, is made large, and a diameter of a part covering the aluminum core wires 51 is made small, such that the crimp portion 30 conforms to the outer diameter of the coated wire 50. When the electric wire crimp tubular portion 30b is crimped to the small-diameter aluminum core wires 51, the aforementioned configuration can prevent not only the tube from being bent internally at the middle but also a gap from being generated therein as a result of excessive thickness of the plate material. As a result, a crimp terminal with better waterproof property and electrical property can be provided.

[2. Method for Manufacturing Crimp Terminal (One-Cycle Welding)]

Figure 4:
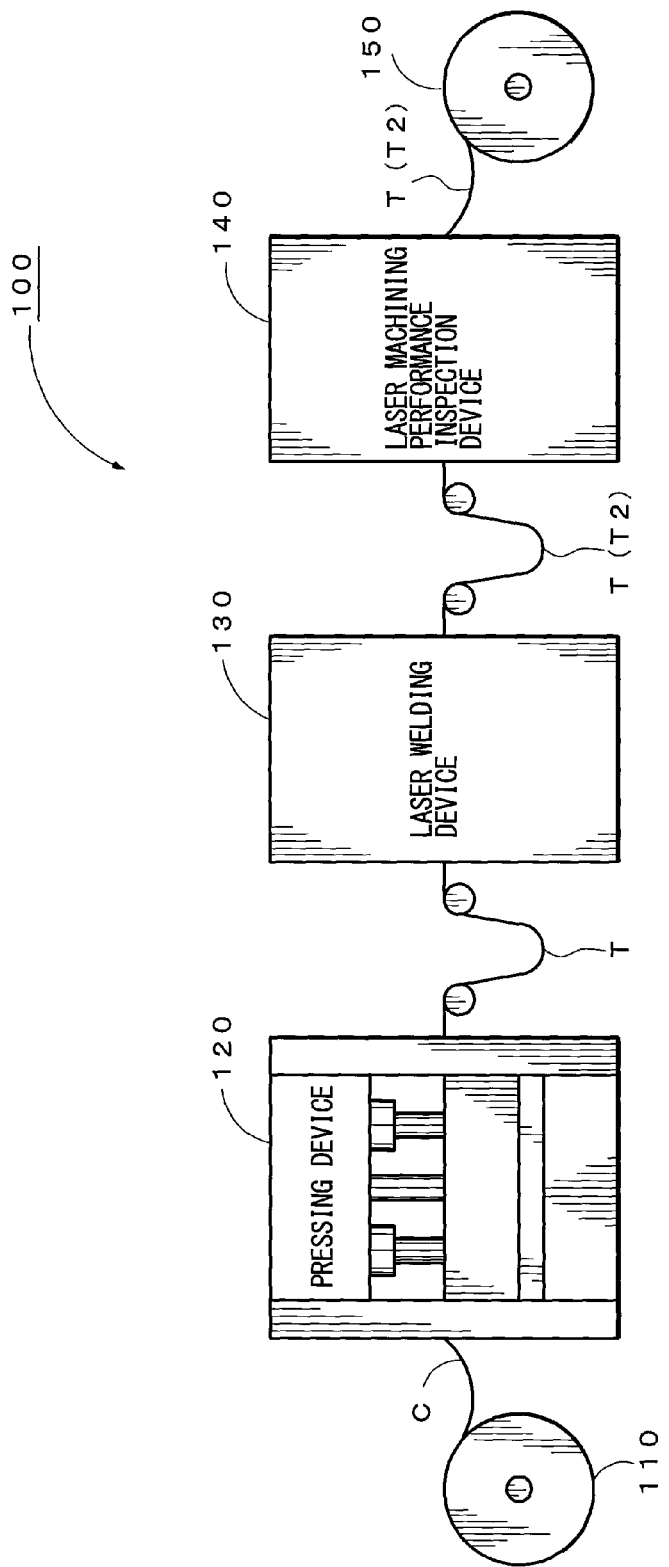
FIG. 4 is a schematic diagram showing a configuration of a terminal manufacturing apparatus.
Figure 5A:
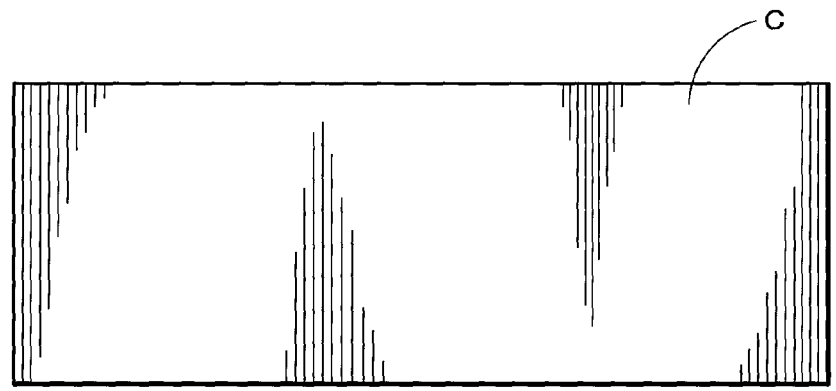
FIG. 5A is a plan view of a copper strip, FIG. 5B a plan view of a chained terminal after primary pressing, and FIG. 5C a plan view of a chained terminal after secondary pressing.

Next, an apparatus for implementing the method for manufacturing a crimp terminal according to the present embodiment is described with reference to FIG. 4, and a procedure for producing the crimp terminal is described with reference to FIGS. 5A to 5C.

[2-1. Configurations of Terminal Manufacturing Apparatus]

The respective components of the terminal manufacturing apparatus 100 will be described hereinbelow.

The unwinding roller 110 is a mechanism for unwinding and supplying a copper strip C, which is as a workpiece wound into a roll shape, at a predetermined speed. The unwinding roller 110 conveys the copper strip C from the roll continuously at a speed that is determined based mainly on the pressing timing of the pressing device 20.

As will be described below, the copper strip C is conveyed intermittently through the pressing device 120 in accordance with the pressing timing. Therefore, as shown in FIG. 4, the copper strip C is caused to sag by a fixed amount between the unwinding roller 110 and the pressing device 120 in order to absorb the difference in conveyance timing between intermittent conveyance and continuous conveyance.

The pressing device 120 is an apparatus that performs press molding such as punching and bending on the copper strip C supplied from the unwinding roller 110 while intermittently conveying the copper strip C by a conveyance mechanism, not shown, to form a chained terminal T. A specific method for processing the chained terminal T will be described hereinafter with reference to FIGS. 5A to 5C.

A laser welding device 130 is an apparatus that laser-welds and joins a butted portion Td that is formed on a bent portion of the chained terminal T, to configure an electric wire connecting portion into a hermetically-closed structure. Fiber laser welding is used as the laser welding performed by the laser welding device 130. Due to its excellent beam quality and high light-collecting properties, a fiber laser can realize laser welding of higher energy density in a machining range, compared to a laser of the related art. Accordingly, a material can be processed at high speed, and deep penetration welding can be achieved with little thermal effect and at a high aspect ratio, preventing not only deterioration of the strength of the crimp portion 30 but also deformation thereof and achieving appropriate sealing between the two end portions 32a. The fiber laser may be emitted by continuous oscillation, pulsed oscillation, QCW oscillation, or pulse-controlled continuous oscillation. The fiber laser may be a single mode or multimode fiber laser.

A laser machining performance inspection device 140 is a device that inspects the machining performance on a laser-welded chained terminal T2. More specifically, the laser machining performance inspection device 140 inspects a welding result achieved by the laser welding device 130 on the laser welded butted portion Td by determining whether or not an amount of axial direction positional deviation of a welding position and a bead width are within allowable ranges using an image capturing unit such as a CCD camera.

Note that the chained terminal T is conveyed along a conveyance path between the pressing device 120 and the laser welding device 130 while being allowed to sag. Similarly, the chained terminal T is conveyed along a conveyance path between the laser welding device 130 and the laser machining performance inspection device 140 while being allowed to sag. The reason for this is that deviations occur between the processing timings of the pressing device 120 and the laser welding device 130 and between the processing timings of the laser welding device 130 and the laser machining performance inspection device 140, and by allowing the chained terminal T to sag between processes, these deviations are absorbed.

The winding roller 150 is a mechanism that winds up the chained terminal T2 at the same speed as the unwinding roller 110. Note that with regard to the winding roller 150, similarly to the unwinding roller 110, the chained terminal T2 is conveyed through the laser welding device 130 or laser machining performance inspection device 140 constituting the previous process intermittently in accordance with the timing of the laser machining or inspection processing. Therefore, as shown in FIG. 4, the chained terminal T2 is caused to sag by a fixed amount between the winding roller 150 and the laser machining performance inspection device 140 in order to absorb a conveyance timing difference between intermittent conveyance and continuous conveyance.

As described above, an example in which the laser welding device 130 and the laser machining performance inspection device 140 are configured as separate devices is shown for ease of description, but the functions of the laser machining performance inspection device 140 can be incorporated in the laser welding device 130. In other words, the functions of the laser machining performance inspection device 140 may be realized by providing an image inspection camera in the conveyance path in the laser welding device 130 on the conveyance path of the chained terminal T2 on a downstream side of the laser welding device 130 where a laser machining portion is provided.

[2-2. Method for Manufacturing Crimp Terminal]

An overview of the method for manufacturing a crimp terminal according to the present embodiment is now described. The crimp terminal 10 shown in FIGS. 1 and 2 is produced by performing a pressing process for pressing the copper strip C shown in FIG. 5A using the pressing device 120 shown in FIG. 4 and then a welding process for laser-welding the copper strip C using the laser welding device 130. The copper strip C is a plate material before processing made of metal consisting of a copper alloy strip such as brass containing copper (Cu) of 70% or more and having a tin-plated (Sn-plated) surface. More specifically, a copper alloy FAS-680 (0.25 mm-thick) manufactured by Furukawa Electric Co., Ltd. is used as the most suitable base material. The alloy composition of FAS-680 is as follows: 2.0 to 2.8 mass % nickel (Ni), 0.45 to 0.6 mass % silicon (Si), 0.4 to 0.55 mass % zinc (Zn), 0.1 to 0.25 mass % tin (Sn), 0.05 to 0.2 mass % magnesium (Mg), and the balance consisting of copper (Cu) and incidental impurities.

Instead of the copper strip C, a steel plate, an aluminum plate, or other plate materials or plate bars with metal other than copper, can be used as the pre-processed metal plate. Basically, a base material made of a metallic material (aluminum, steel, or alloy consisting primarily thereof) can be used in order to ensure the conductivity and strength of the crimp terminal. A part or whole of the crimp terminal may be tin-plated or silver-plated in order to secure various characteristics of the crimp terminal.

Figure 5B:
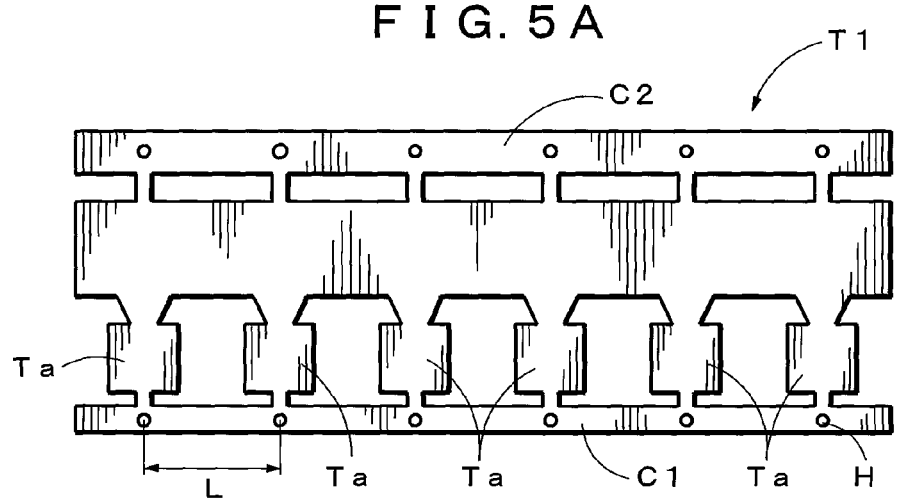

In the pressing process, the copper strip C is punched to form a pre-final pressed chained terminal T1, as shown in FIG. 5B. The pre-final pressed chained terminal T1 includes a plurality of pre-bending crimp terminals Ta that becomes the crimp terminal 10 after being bent, and upper and lower carrier portions C1 and C2 that connect the plurality of pre-bending crimp terminals Ta and are supported when conveyed, the plurality of pre-bending crimp terminal Ta. The upper carrier portion C1 is a belt-like holding member disposed at an upper part of the pre-bending crimp terminals Ta. The lower carrier portion C2, on the other hand, is disposed at a lower part of the pre-bending crimp terminals Ta which become the plate material.

Figure 5C:
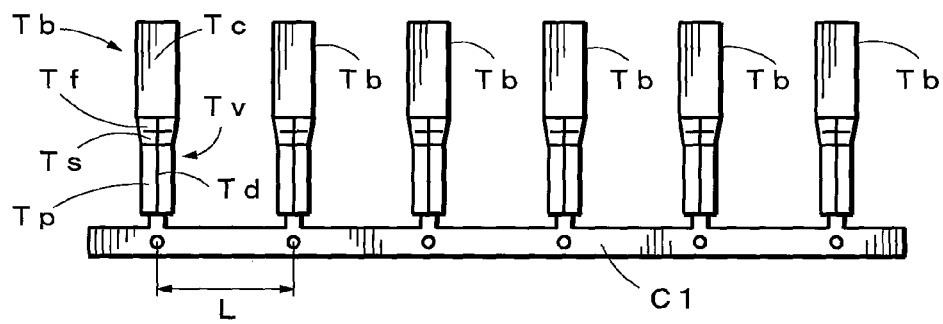

Further, in the pressing process, the pre-bending crimp terminals Ta of the pre-final pressing chained terminal T1 are bent into pre-welding crimp terminals Tb, each of which having a barrel portion Tv that becomes a barrel member and a connector portion Tc, as shown in FIG. 5C. The barrel portions Tv each becomes a tube that is formed by placing its side edges side by side, i.e., a tube having its side edges attached to each other. Thereafter, an end portion of each barrel portion Tv on the connector portion Tc side in the longitudinal direction is pressed and squeezed, and an opening portion of the barrel portion Tv on the connector portion Tc side is closed to form a closed portion. Further, an inclined portion Ts is formed on the connector portion Tc side by squeezing the end portion of the barrel portion Tv, and the remaining tubular portion that is not squeezed is configured as a tubular portion Tp. A tip end of the inclined portion Ts is configured as a sealing portion Tf.

Subsequently, the butted portion Td and sealing portion Tf of the tubular portion Tp in each of the unwelded crimp terminals Tb are welded by a laser welding device, not shown, to produce a crimp terminal having a waterproof property.

Herein, an example of welding the butted portion of the tubular portion Tp is illustrated. However, not only the butted portion but also a lapped portion can be joined by laser welding.

Additionally, the crimp terminal in which the butted portion and sealing portion Tf of the tubular portion Tp are welded has the coated wire 50 inserted therein from the side of the electric wire crimp tubular portion 30b opposite from the box portion 20, and then the electric wire crimp tubular portion 30b and the aluminum core wires 51 are crimped together using a crimping tool which is not shown.

After the crimping, the aluminum core wire 51 is compressed and enters into the wires locking groove 33b formed on the inner surface of the electric wire crimp tubular portion 30b, swaging the crimp portion. As a result, mechanical strength is created, as well as a newly formed surface on the interface of the squeezed metallic body. Consequently, secure electrical connection is realized as a result of the contact of the newly formed surface.

It should be note that accomplishing the electrical connection between the inner surface of the electric wire crimp tubular portion 30b and the aluminum core wires 51 is not limited to the aforementioned method in which the wire locking grooves 33b are provided. For instance, as disclosed in Japanese Laid-Open Patent Publication No. 2003-223948 by the applicant of the present disclosure, the electric wire crimp tubular portion 30b can be swaged by means of a pressing blade die configured by a receiving die and a pressurizing die, to form a recess on the surface of the electric wire crimp tubular portion 30b as shown in FIG. 6, thereby electrically connecting the inner surface of the electric wire crimp tubular portion 30b and the aluminum core wires 51 to each other.

In so doing, the butted portion and sealing portion Tf of each laser-welded tubular portion Tp need to be laser-welded in order to satisfy the crimping force for crimping and the mechanical strength and electrical connectivity to be obtained after the crimping. As a result of studying various parameters associated with the welding characteristics such as the intensity and the sweep rate of the laser light, it was confirmed that the crimping force for crimping and the mechanical strength and electrical connectivity to be obtained after the crimping can be satisfied by optimally controlling the width of the weld bead formed on the laser-welded butted portion. In other words, by measuring only the width of the weld bead obtained after the laser welding, a crimp terminal that remains reliable even after the crimping process can be ensured. Specifically, the power density of the laser light and the sweep rate of the laser light are set such that the width of the weld bead becomes 80 µm to 390 µm or more preferably 180 µm to 270 µm.

In other words, the butted portion or sealing portion Tf of the tubular portion Tp of the crimp portion 30 is irradiated with the laser light from one end to the other. As a result of this laser irradiation, a plating weld bead with a weld bead width D of 80 µm to 390 µm or more preferably 172 µm to 273 µm can be formed as shown in FIG. 7. More preferably, the plate material is penetration welded by laser welding. This penetration welding enables positive welding penetrating from the front surface to the rear surface of the plate material, achieving high-quality welding.

However, when the weld bead width D is less than 80 µm, it might cause incomplete penetration welding. A part resulted from incomplete penetration welding may cause breakage of the weld portion when crimping the crimp portion to the electric wire terminals. In addition, various impacts can be considered when the weld bead width D is greater than 390 µm, such as excessive sputtering due to excessive heat, deterioration in waterproof property caused by burn-through of the thinned weld portion resulting from excessive sputtering, and deterioration of wire insertability.

Figure 8:
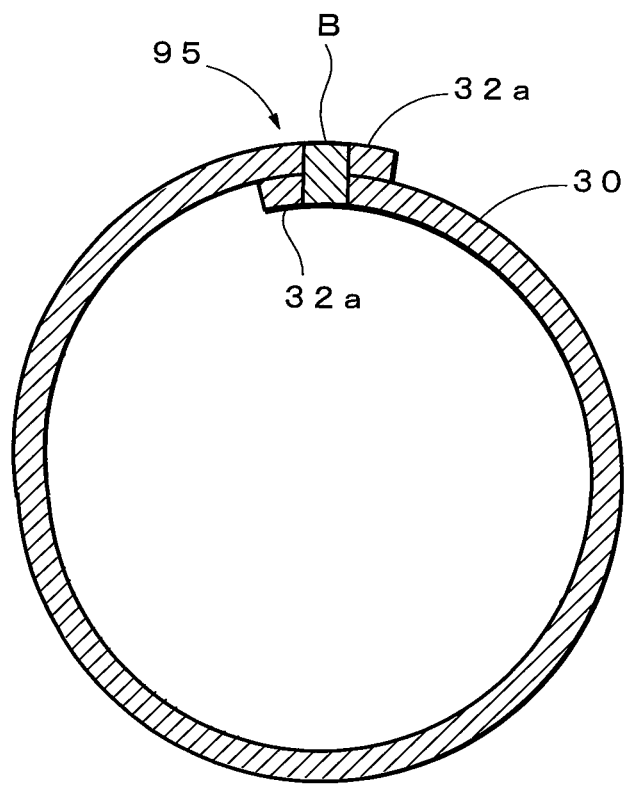
FIG. 8 is a cross-sectional diagram illustrating a structure of a crimp portion of the crimp terminal.

Note that another method for manufacturing a crimp portion according to the present disclosure can be applied to a configuration shown in FIG. 8 in which the end portions 32a in the bending direction of the plate material constituting the crimp portion 30 are lapped on top of each other to form a lapped portion 95. In this case, penetration welding is performed by radiating and sweeping laser light on the lapped portion 95 so that a weld bead B of 80 µm to 390 µm or preferably 172 µm to 273 µm is formed on the outer surface of the crimp portion 30.

This method can also be applied to a configuration in which the end portions 32a are lapped on top of each other, but the total plate thickness of the lapped end portions needs to be 0.8 mm or less. Therefore, when using a plate material having a thickness of 0.5 mm and lapping the end portions on top of each other, the end portions need to be processed into thin plates beforehand. This processing can be performed in order to form tapered or stepped end portions.

While two-cycle welding in which pressing and laser welding are repeated twice is performed in the related art to form the crimp portion 30, the method for manufacturing the crimp terminal 10 using the terminal manufacturing apparatus 100 according to the present embodiment achieves one-cycle welding in which pressing and laser welding are performed only once. In other words, after processing the crimp portion 30 into a tubular body first, the coating crimp tubular portion 30a can be laser-welded, thereafter the squeezing process can be performed again to form the electric wire crimp tubular portion 30b, the sealing portion 30c, and the inclined portion 30d, and then the squeezed portion can be laser-welded.

Note that the present disclosure is not limited to the embodiment described above. For example, although the above has described the example in which the crimp portion of the crimp terminal is crimped and connected to the electric wire conductor made of aluminum or an aluminum alloy, substantially the same operations and effects as those of the foregoing embodiment can be achieved even by crimping and connecting the crimp portion to an electric wire conductor made of, for example, copper or a copper alloy other than aluminum or an aluminum alloy. The crimp portion with the foregoing configuration is capable of preventing ingress of moisture during its crimped state, enabling connection of coated wires that are configured by copper or a copper alloy core wires and conventionally needed to be sealed in order to block the ingress of moisture into the wires.

EXAMPLES

Specific examples of laser-welding the crimp terminal are described next as examples of the method for manufacturing the crimp terminal.

Example 1

Example Using Copper Alloy

In order to illustrate the foregoing fact that measuring only the weld bead width after the laser welding can result in ensuring a crimp terminal that remains reliable even after the crimping process, the sweep rate of laser light for laser welding was changed between 20 mm/sec and 400 mm/sec to examine the weldability and post-welding crimping quality. A fiber laser was used as the laser source.

TABLE 1

| SWEEP RATE (mm/sec) | BEAD WIDTH (µm) | WELD-ABILITY | CRIMPING QUALITY |
|---|---|---|---|
| 400 | 68 | X | X |
| 390 | 70 | X | X |
| 380 | 76 | X | X |
| 370 | 80 | Δ | Δ |
| 360 | 85 | Δ | Δ |
| 350 | 89 | Δ | Δ |
| 340 | 91 | ◯ | Δ |
| 330 | 94 | ◯ | Δ |
| 320 | 97 | ◯ | Δ |
| 310 | 101 | ◯ | ◯ |
| 300 | 103 | ◯ | ◯ |
| 290 | 107 | ◯ | ◯ |
| 280 | 111 | ◯ | ◯ |
| 270 | 114 | ◯ | ◯ |
| 260 | 119 | ◯ | ◯ |
| 250 | 124 | ◯ | ◯ |
| 240 | 130 | ◯ | ◯ |
| 230 | 137 | ◯ | ◯ |
| 220 | 145 | ◯ | ◯ |
| 210 | 153 | ◯ | ◯ |
| 200 | 161 | ◯ | ◯ |
| 190 | 172 | ◎ | ◯ |
| 180 | 183 | ◎ | ◯ |
| 170 | 193 | ◎ | ◯ |
| 160 | 208 | ◎ | ◯ |
| 150 | 219 | ◎ | ◯ |
| 140 | 229 | ◎ | ◯ |
| 130 | 240 | ◎ | ◯ |
| 120 | 249 | ◎ | ◯ |
| 110 | 261 | ◎ | ◯ |
| 100 | 273 | ◎ | ◯ |
| 90 | 286 | ◯' | ◯ |
| 80 | 296 | ◯' | ◯ |
| 70 | 307 | ◯' | ◯ |
| 60 | 325 | ◯' | ◯ |
| 50 | 344 | ◯' | ◯ |
| 40 | 365 | ◯' | ◯ |
| 30 | 390 | ◯' | Δ |
| 20 | 400 | X | X |

The conditions of this example are as follows. Specifically, aforementioned copper alloy FAS-680 (0.25 mm-thick) manufactured by Furukawa Electric Co., Ltd. was used as the plate material. The wavelength of the laser light is 1084 nm. The output power of the laser light is 400 W. The spot diameter of the laser light is approximately 20 μm. The power density of the laser light is 96 MW/cm². The sweep rate of the laser light is appropriately adjusted between 20 mm/sec and 400 mm/sec as described above, and only representative examples are shown in Table 1.

The second column of Table 1 shows "bead width." This bead width is a weld bead width (μm) obtained when the butted surfaces of the plate material at the butted portion of the tubular portion Tp matches the laser irradiation axis.

The column on the right-hand side of the "bead width" column shows "weldability." This "weldability" is evaluated as "⊚", "○", "○+", "Δ" and "x."

The symbol "⊚" means that the butted portion was welded successfully even when the laser irradiation axis was shifted from the butted surfaces by at least ±60μm and that a good welded section was formed.

The symbol "○" means that the butted portion was welded successfully even when the laser irradiation axis was shifted from the butted surfaces by at least ±40 μm and that a good welded section was formed.

The symbol "○+" means that the butted portion was welded successfully even when the laser irradiation axis was shifted from the butted surfaces by at least ±60 μm but the thermal impact on the welding base material around the weld portion was significant.

The symbol "Δ" means that the butted portion was welded successfully even when the laser irradiation axis was shifted from the butted surfaces by at least ±20

The symbol "x" means that penetration welding was not performed successfully due to insufficient burn-through or that the weld portion has melted excessively and resulted in burn-through.

The column on the right-hand side of the "weldability" column shows "crimping quality." This "crimping quality" is evaluated as "○," "Δ," and "x." These evaluation results show whether the crimp terminal was able to withstand the process of crimping the electric wire crimp tubular portion 30b to the aluminum core wires 51 after the welding process. As a result of examining the appearance of the crimp terminal after the crimping process, the result of the crimp terminal was evaluated as "○" for a case where the crimp terminal was able to withstand the crimping process, "x" for a case where the crimp terminal was not able to withstand the crimping process, and "Δ" for a case where whether or not the crimp terminal withstood the crimping process could not be determined. In this evaluation, as a result of examining the appearance of the crimp terminal after the crimping process, the result of the crimp terminal was evaluated as "○" for a case where there were no cracks, "Δ" for a case where a crack was observed but the core wires or coating of the electric wires were not observed, and "x" for a case where a crack was observed and the core wires or coating of the electric wires.

According to the evaluation results shown in Table 1, the weldability was evaluated as "⊚" "○,", "○+", "Δ" and "x when the weld bead width was 80 μm to 390 μm. Especially when the weld bead width was 172 μm to 273 μm, there were no problems on the welded section, and therefore the crimp terminal was evaluated as "⊚."

When the weld bead width was 286 μm to 390 μm (when the crimp terminal was evaluated as "○+") and 400 μm (when the crimp terminal was evaluated as "x"), welding was performed successfully, but excessive sputtering due to excessive heat and burn-through of the weld portion were observed, hence generation of a internal void in the weld portion. When the weld bead width was 80 μm to 89 μm (when the crimp terminal was evaluated as "Δ"), welding was done successfully, but a region with incomplete penetration welding where the back of the plate material was not welded was observed on the welded section, which indicated that the accuracy of setting the target was close to the limit. However, when the weld bead width was 76 μm (when the crimp terminal was evaluated as "x") or less, welding was not performed successfully due to incomplete penetration welding, and when the weld bead width was 400 μm (when the crimp terminal was estimated as "x") or more, welding was not performed successfully due to burn-through of the weld portion.

In terms of crimping the electric wire crimp tubular portion 30b and the aluminum core wires 51 to each other after the welding process, no defects such as cracks were observed even when the electric wire crimp tubular portion 30b was crimped to the aluminum core wires 51, with the weld bead width of 101 μm to 365 μm. Therefore, the crimp terminal was evaluated as "○". When the weld bead width was 80 μm to 97 μm, welding was done successfully in spite of a region with incomplete penetration welding. Therefore, the crimp terminal was evaluated as "Δ". When the weld bead width was 390 μm, burn-through occurred in a part of the weld bead, i.e., the weld bead at the part of the electric wire crimp tubular portion into which the electric wires are inserted. Therefore, the crimp terminal was evaluated as "Δ". On the other hand, when the weld bead width was equal to or less than 76 μm but equal to or greater than 400 μm, the crimp terminal was evaluated as "x" due to incomplete penetration welding or the occurrence of burn-through.

In a representative example of welding two stacked plate materials each of which has a thickness of 0.25 mm, the output power of laser light was 400 W, the spot diameter of the laser light was approximately 20 μm, and the laser sweep rate was 130 mm/sec. Under these conditions, the weld bead width was 200 μm, and the weldability and crimping quality were evaluated as "⊚" and "○".

As described above, the power density of the laser light and the sweep rate of the laser light are set in such a manner that a weld bead width of 80 μm to 390 μm, preferably 101 μm to 365 μm, or more preferably 172 μm to 273 μm is obtained. With these ranges of weld bead width, a crimp terminal that remains reliable even after the crimping process can be ensured by measuring only the weld bead width obtained after the laser welding process.

Example 2

Example Using Brass

Next is described Example 2 in which brass is used in a plate material configuring a crimp terminal, in order to illustrate the fact that measuring only the weld bead width after the laser welding process can result in ensuring a crimp terminal that remains reliable even after the crimping process.

The conditions of this example are as follows. Specifically, C2600 (0.25 mm-thick), 7:3 brass, was used as the plate material. A fiber laser was used as the laser light. The wavelength of the laser light is 1084 nm. There are three levels of output powers of the laser light: 250 W, 350 W, and 400 W. The spot diameter of the laser light is approximately 60 μm. The power density of the laser light is 12 MW/cm². The sweep rate of the laser light is 100 mm/sec, 200 mm/sec, 250 mm/sec, 300 mm/sec, and 400 mm/sec. The results are shown in Table 2.

TABLE 2

| | | LASER DRIVE CONDITION | | WELD TERMINAL | | |
|---|---|---|---|---|---|---|
| | | OUTPUT POWER [W] | SWEEP RATE (mm/sec) | MATERIAL | BEAD WIDTH (μm) | WELD-ABILITY | CRIMPING QUALITY |
| EXAMPLE | 1 | 200 | 100 | C2600 | 89 | ○ | ○ |
| | 2 | 200 | 200 | | 89 | ○ | ○ |
| | 3 | 250 | 100 | | 103 | ○ | ○ |
| | 4 | 250 | 200 | | 94 | ○ | ○ |
| | 5 | 250 | 300 | | 80 | ○ | ○ |
| | 6 | 350 | 100 | | 175 | ○ | ○ |
| | 7 | 400 | 200 | | 259 | ○ | ○ |
| | 8 | 400 | 220 | | 188 | ○ | ○ |
| | 9 | 400 | 300 | | 174 | ○ | ○ |
| COMPARATIVE EXAMPLE | 1 | 250 | 400 | | 70 | Δ | X |
| | 2 | 400 | 100 | | 271 | Δ | X |

According to Table 2, when the weld bead width was greater than or equal to 80 μm as shown in Examples (1) to (9), good welding results were obtained without any problems with penetration welding. The weldability evaluated as "○" means that penetration welding was successful and that there were few weld voids. On the other hand, the weldability evaluated as "Δ" means at least either there exists a part with incomplete penetration welding or there are many weld voids. In other words, when the bead width was less than 80 μm such as 70 μm as shown in Comparative Example (1), insufficient penetration welding was performed. However, when the bead width was 271 μm as shown in Comparative Example (2), a large number of weld voids were observed, and the welding quality was poor. These facts indicate that a crimp terminal that remains reliable even after the crimping process can be ensured by setting the weld bead width within the range of 80 μm to 270 μm. In other words, when brass is used and the bead width is 80 μm to 270 μm, good weldability and crimping quality can be obtained. Especially the use of brass as the material can lead to more favorable welding results even when the range of bead width is narrow, i.e., greater than or equal to 80 μm but less than or equal to 100 μm, compared to a case where copper alloy FAS-680 explained in Example 1 is used.

Other Examples

In another example in which the thickness of the plate material of the crimp terminal is changed, a crimp terminal that remains reliable even after the crimping process can be ensured by setting the power density of the laser light and the sweep rate of the laser light in such a manner that a weld bead width of 80 μm to 390 μm or preferably 180 μm to 270 μm is obtained.

Specifically, in Example 2 in which C2600, 7:3 brass, was used as the plate material, the thickness of the plate material was 0.25 mm, but experiments were performed with thicknesses of 0.2 mm, 0.3 mm, 0.385 mm, 0.64 mm, and 0.8 mm. A fiber laser was used as the laser source.

The results are shown in Table 3 below.

TABLE 3

| THICKNESS (mm) | LASER OUTPUT POWER [W] | SWEEP RATE (mm/sec) | BEAD WIDTH (μm) | WELD-ABILITY | CRIMPING QUALITY |
|---|---|---|---|---|---|
| 0.2 | 350 | 200 | 227 | ○ | ○ |
| 0.3 | 400 | 140 | 210 | ○ | ○ |
| 0.385 | 400 | 140 | 228 | ○ | ○ |
| 0.64 | 400 | 100 | 132 | ○ | ○ |
| 0.8 | 400 | 100 | 96 | ○ | ○ |

In the other examples in which the following materials are used as the plate materials of crimp terminals, crimp terminals that remain reliable even after the crimping process can be ensured by setting the power density of the laser light and the sweep rate of the laser light in such a manner that a weld bead width of 80 μm to 390 μm or preferably 180 μm to 270 μm is obtained.

Examples of the other materials that can be used include copper alloy containing Fe (e.g., KLF-5, KLF194 manufactured by Kobe Steel, Ltd.), copper alloy containing Cr (e.g., EFTEC-8, EFTEC-64T manufactured by Furukawa Electric Co., Ltd.), corson copper alloy (e.g., FAS-680 manufactured by Furukawa Electric Co., Ltd., MAX251 manufactured by Mitsubishi Shindoh Co., Ltd.), copper alloy containing a large quantity of Ni or Sn (e.g., MX96 manufactured by Mitsubishi Electric Metecs Co., Ltd.), and copper alloy containing Mg (e.g., MSP1 manufactured by Mitsubishi Shindoh Co., Ltd.).

Specifically, the results are as shown in Table 4 below. Note that the spot diameter of the laser light and the thickness of the plate material that are used in the measurements are approximately 20 μm and 0.25 mm, respectively.

TABLE 4

| MATERIAL | LASER OUTPUT POWER [W] | SWEEP RATE (mm/sec) | BEAD WIDTH (μm) | WELD-ABILITY | CRIMPING QUALITY |
|---|---|---|---|---|---|
| EFTEC-8 | 400 | 130 | 368 | ○ | ○ |
| EFTEC-64T | 500 | 50 | 383 | ○ | ○ |
| MSP1 | 500 | 80 | 389 | ○ | ○ |
| MAX251 CR-H | 400 | 130 | 207 | ○ | ○ |
| MAX251 R 1/2 | 400 | 130 | 204 | ○ | ○ |
| MAX251 C EH | 400 | 130 | 257 | ○ | ○ |
| KLF-5 | 400 | 130 | 225 | ○ | ○ |
| MX96 | 400 | 130 | 300 | ○ | ○ |

The measurement results of lapping welding performed in the other examples are shown in Table 5 below. In the process of lapping welding as well, copper alloy containing Fe, copper alloy containing Cr, corson copper alloy, copper alloy containing a large quantity of Ni or Sn, and copper alloy containing Mg can be used. The spot diameter of the fiber laser used in the measurements was approximately 20 μm, and the thickness of the weld portion where two 0.25 mm-thick plate materials are overlapped on top of each other is 0.5 mm.

TABLE 5

| MATERIAL | LASER OUTPUT POWER [W] | SWEEP RATE (mm/sec) | BEAD WIDTH (μm) | WELD-ABILITY | CRIMPING QUALITY |
|---|---|---|---|---|---|
| EFTEC-8 | 400 | 130 | 236 | ○ | ○ |
| EFTEC-64T | 400 | 80 | 238 | ○ | ○ |
| MSP1 | 400 | 130 | 200 | ○ | ○ |
| MAX251 CR-H | 400 | 130 | 132 | ○ | ○ |
| MAX251 R 1/2 | 400 | 130 | 129 | ○ | ○ |
| KLF-5 | 400 | 80 | 193 | ○ | ○ |
| MX96 | 400 | 130 | 279 | ○ | ○ |

By setting the weld bead width at 80 μm to 390 μm in a copper alloy containing copper of 70% or more, as described above, terminals with good welding quality and crimping quality can be provided.

What is claimed is:

1. A method for manufacturing a crimp terminal having a crimp portion that allows crimp connection to a conductor part of a coated wire, the method comprising:
    forming a tubular body by bringing together side edges of a plate material made of metal composed of a copper alloy having a copper content ratio of greater than or equal to 70%;
    forming a sealing portion by pressing and squeezing an end of the tubular body;
    irradiating a periphery of the sides edges, which are brought together, with laser light from a laser irradiation unit in such a manner that the periphery of the side edges which are brought together is penetration welded;
    irradiating the sealing portion with laser light from the laser irradiation unit to weld the sealing portion; and
    setting a power density of the laser light and a sweep rate of the laser light in such a manner that a weld bead formed at the side edge portion after the penetration welding has a width of 80 μm to 390 μm.

2. The method for manufacturing a crimp terminal according to claim 1, wherein a laser light source of the laser irradiation unit is a fiber laser.

3. The method for manufacturing a crimp terminal according to claim 1, wherein the power density of the laser light and the sweep rate of the laser light are set in such a manner that the weld bead formed on the welded side edges has a width of 172 μm to 273 μm.

4. The method for manufacturing a crimp terminal according to claim 1, wherein a thickness of the plate material which is formed into the tubular body irradiated with the laser light is adjusted to less than or equal to 0.8 mm.

5. A crimp terminal having a crimp portion that allows crimp connection to a conductor part of a coated wire, the crimp terminal comprising:
    a brought-together portion obtained by bringing together side edges of a plate material metal made of metal composed of a copper alloy having a copper content ratio of greater than or equal to 70%;
    a sealing portion obtained by pressing and squeezing an end of a tubular body that is formed by bringing together the side edges of the plate material, the sealing portion being welded by laser light from the laser irradiation unit; and
    a weld bead portion that is formed at the brought-together portion by being irradiated with laser light emitted from the laser irradiation unit in such a manner that the brought-together portion is penetration welded,
    wherein the penetration weld bead portion has a width of 80 μm to 390 μm.

6. The crimp terminal according to claim 5, wherein a laser light source of the laser irradiation unit is a fiber laser.

7. The crimp terminal according to claim 5, wherein the width of the weld bead portion is 101 μm to 365 μm.

8. The crimp terminal according to claim 7, wherein the width of the weld bead portion is 172 μm to 273 μm.

9. The crimp terminal according to claim 5, wherein the brought-together portion has a thickness of less than or equal to 0.8 mm.

10. The crimp terminal according to claim 5, wherein the brought-together portion is formed by bringing the side edges into abutment with each other.

11. The crimp terminal according to claim 5, wherein the brought-together portion is formed by overlapping the side edges on top of each other.

12. A wire harness comprising at least one coated wires, wherein an end portion of each of the at least one coated wires is provided with a crimp terminal having a crimp portion that allows crimp connection to a conductor part of a coated wire, the crimp terminal comprising:
a brought-together portion obtained by bringing together side edges of a plate material metal made of metal composed of a copper alloy having a copper content ratio of greater than or equal to 70%;
a sealing portion obtained by pressing and squeezing an end of a tubular body that is formed by bringing together the side edges of the plate material, the sealing portion being welded by laser light from a laser irradiation unit; and
a weld bead portion that is formed at the brought-together portion by being irradiated with laser light emitted from the laser irradiation unit in such a manner that the brought-together portion is penetration welded,
wherein the penetration weld bead portion has a width of 80 µm to 390 µm.

13. The wire harness according to claim 12, wherein a conductor part of each of the at least one coated wire is made of aluminum or an aluminum alloy.

\* \* \* \* \*